(12) United States Patent
Fyke

(10) Patent No.: US 8,891,236 B2
(45) Date of Patent: Nov. 18, 2014

(54) HOUSINGS THAT MOVE USING A LINK THAT SLIDINGLY ENGAGES CAMS

(75) Inventor: Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 169 days.

(21) Appl. No.: 13/555,792

(22) Filed: Jul. 23, 2012

(65) Prior Publication Data

US 2014/0001936 A1    Jan. 2, 2014

Related U.S. Application Data

(60) Provisional application No. 61/666,439, filed on Jun. 29, 2012.

(51) Int. Cl.
*H05K 5/03* (2006.01)

(52) U.S. Cl.
USPC ................................. 361/679.55; 361/679.01

(58) Field of Classification Search
CPC ... G06F 1/1616; G06F 1/1656; G06F 1/1632; G06F 1/1626; Y02E 60/12
See application file for complete search history.

(56) References Cited

U.S. PATENT DOCUMENTS

| | | | |
|---|---|---|---|
| 2007/0115255 A1* | 5/2007 | Pan | 345/156 |
| 2009/0286573 A1* | 11/2009 | Jang et al. | 455/566 |
| 2012/0120618 A1* | 5/2012 | Bohn | 361/749 |
| 2012/0218690 A1* | 8/2012 | Okutsu | 361/679.01 |

\* cited by examiner

*Primary Examiner* — Jenny L Wagner
*Assistant Examiner* — Michael P McFadden
(74) *Attorney, Agent, or Firm* — Ftch, Even, Tabin & Flannery LLP

(57) ABSTRACT

An apparatus includes a first housing having a first cam and a second housing having a second cam. A link is configured and disposed to slidingly engage these cams. The first housing moves with respect to the second housing between a first position (that comprises a stacked configuration) and a second position (that comprises a deployed configuration). The aforementioned link can include a pair of substantially collinear slots disposed therethrough. The cams, in turn, can be at least substantially pear shaped and can be disposed offset to one another and substantially longitudinally parallel to one another as well. Also if desired, such cams can be disposed on interior surfaces of both housings, and on both sides of the housings as well.

11 Claims, 7 Drawing Sheets

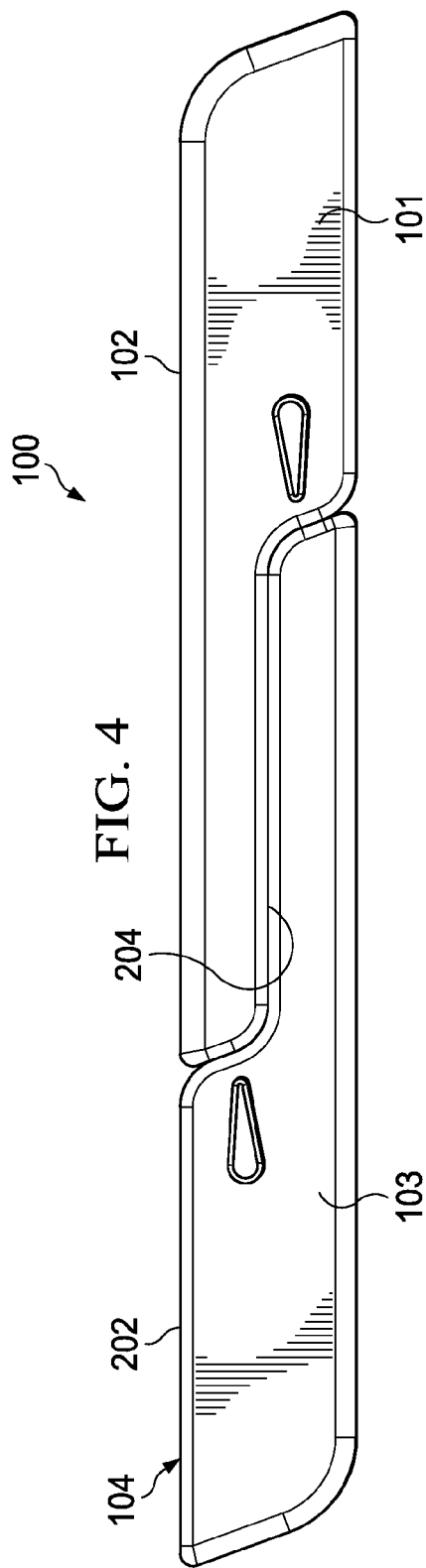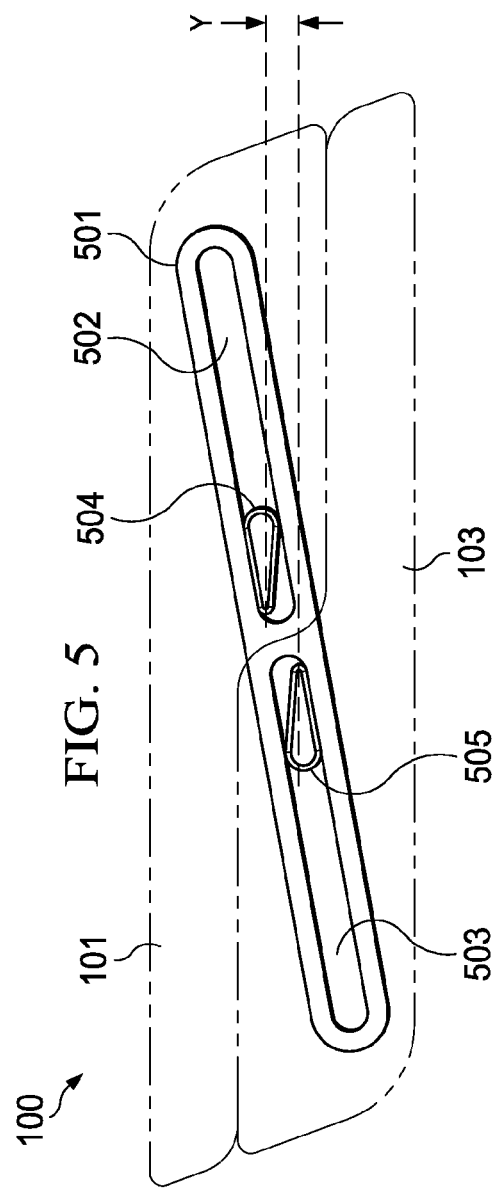

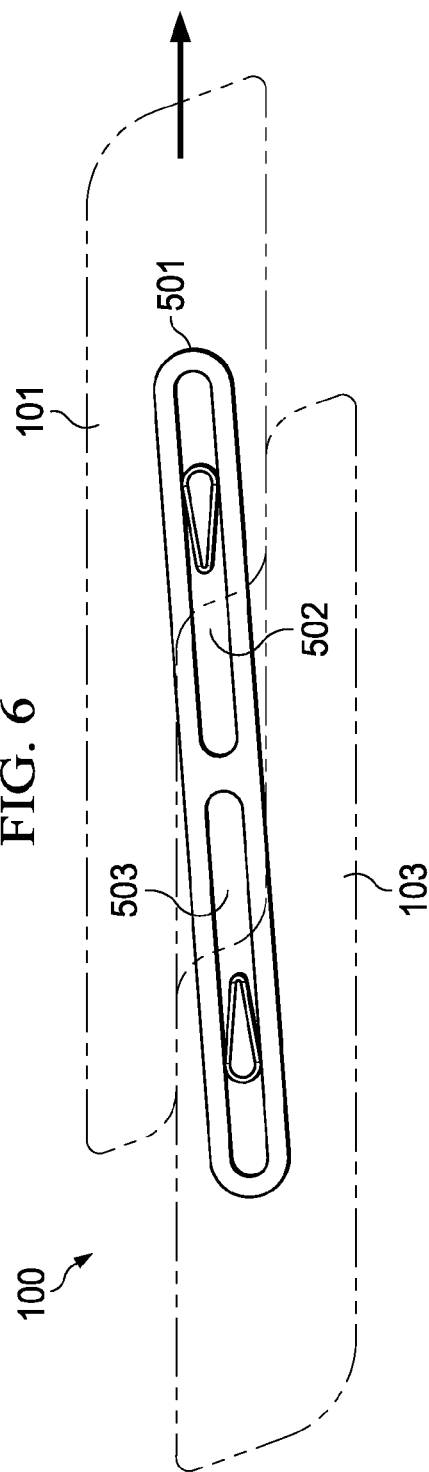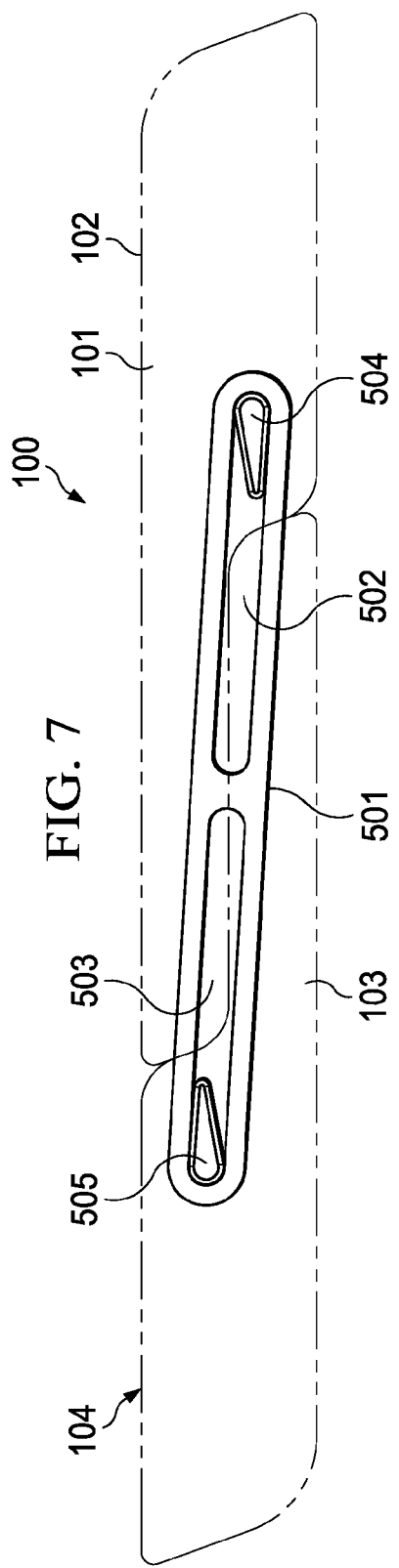

HOUSINGS THAT MOVE USING A LINK THAT SLIDINGLY ENGAGES CAMS

RELATED APPLICATION(S)

This application claims the benefit of U.S. Provisional application No. 61/666,439, filed Jun. 29, 2012, which is incorporated by reference in its entirety herein.

FIELD OF TECHNOLOGY

The present disclosure relates generally to multi-housing apparatuses and more particularly to apparatuses having housings that move relative to one another.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

That said, physical keyboards (as versus a virtual keyboard presented on a touch-sensitive display) are also in demand. Many people find physical keyboards to be easier and/or more accurate to use than a virtual keyboard. Providing a given device with both a touch-sensitive display and a physical keyboard, however, often forces a compromise with respect to the overall size of the apparatus and/or the size of one or both of the display and the keyboard. One design approach separates the device into two housings with one housing having the display and the other housing having the physical keyboard. While a helpful approach in many instances, again, many compromises regarding the relative size of these components and/or ease of use are often required. In addition, many such approaches tend to be mechanically and/or electrically complicated, fragile, and/or expensive to implement.

BRIEF DESCRIPTION OF THE DRAWINGS

FIG. 4 is a side-elevational view in accordance with the disclosure.

FIG. 5 is a side-elevational partially-phantom view in accordance with the disclosure.

FIG. 6 is a side-elevational view in accordance with the disclosure.

FIG. 7 is a side-elevational partially-phantom view in accordance with the disclosure.

DETAILED DESCRIPTION

Figure 1:
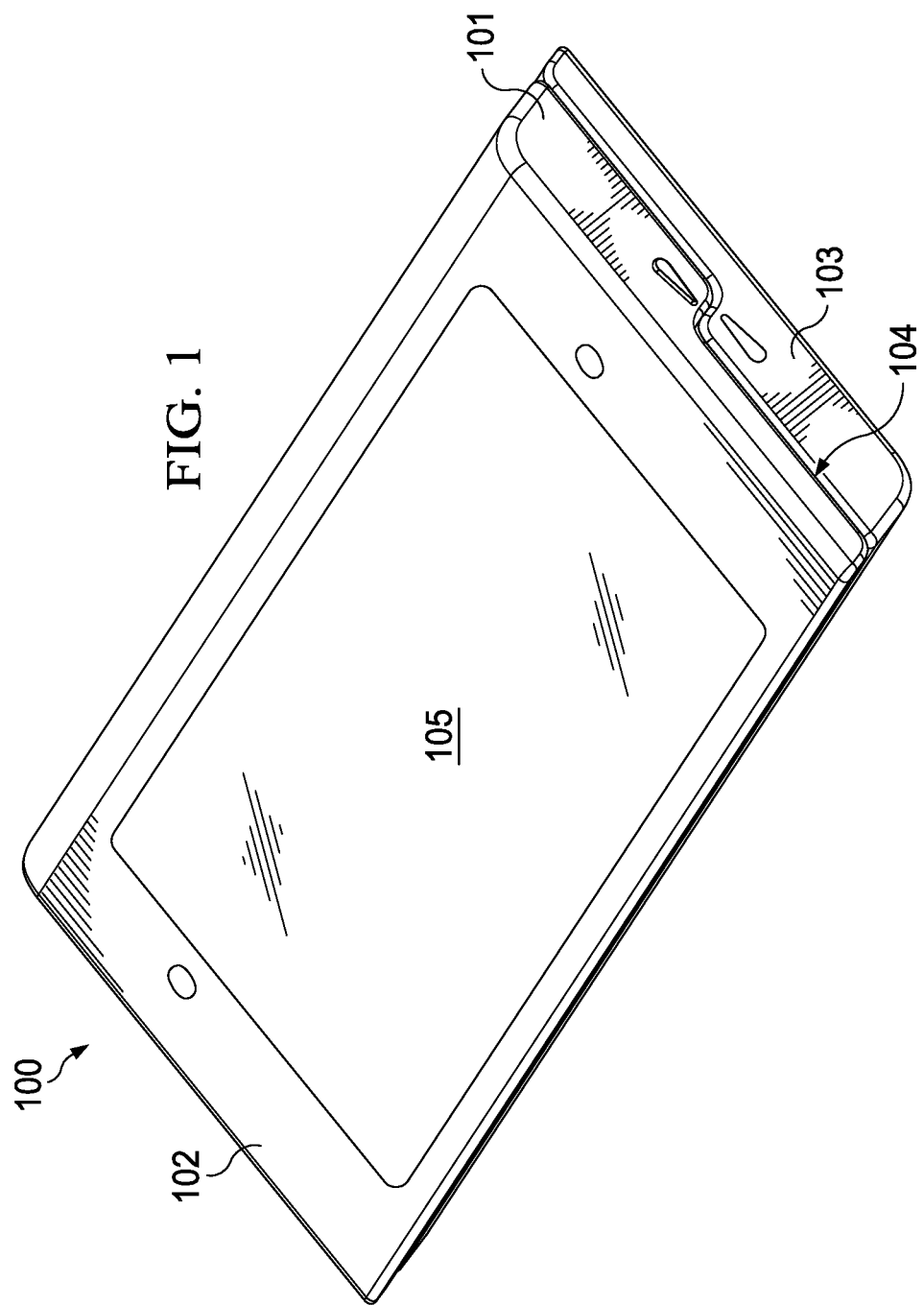
FIG. 1 is a perspective view in accordance with the disclosure.

The following describes an apparatus having a first housing and a second housing. Both housings have a corresponding upper surface and at least one cam. A link is configured and disposed to slidingly engage these cams. So configured, the first housing is movable with respect to the second housing between a first position and a second position. The first position comprises a stacked configuration with the first housing disposed atop the second housing. The second position comprises a deployed configuration with the upper surface of the first housing disposed at least substantially coplanar to at least a portion of the upper surface of the second housing.

By one approach the first housing includes a display (including but not limited to a touch-screen display) and the second housing includes a keyboard (including but not limited to a physical keyboard. So configured, the display can be used sans the keyboard when the housings are deployed in the first position and the display can be used in conjunction with the keyboard when the housings are deployed in the second position.

By one approach the aforementioned link includes a pair of slots disposed therethrough. These slots can be, if desired, substantially collinear to one another. The cams, in turn, can be at least substantially pear shaped and can be disposed offset to one another and substantially longitudinally parallel to one another as well. Also if desired, such cams can be disposed on interior surfaces of both housings, and on both sides of the housings as well. So configured, such a link can be included on both sides of the apparatus to thereby provide smooth, balanced, sturdy movement of the two housings with respect to one another.

By one approach, the upper surface of the second housing includes a non-planar portion (such that this upper surface comprises, in total, a non-planar upper surface). The bottom surface of the first housing, in turn, can conform to that non-planar portion such that the bottom surface of the first housing interlocks with the non-planar portion of the second housing's upper surface. So configured, the two housings (in the second position) effectively form a seemingly integral device that can present both a display and a keyboard in a unitary and substantially coplanar manner.

These teachings permit a pair of housings to be readily moved with respect to one another in a consistent, smooth, intuitive, and guided manner. The supported movement itself can be relatively complex notwithstanding the limited number of moving parts and thereby contribute to a choice of very useful housing configurations. These teachings are highly flexible in practice and will accommodate a variety of housing shapes and sizes.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
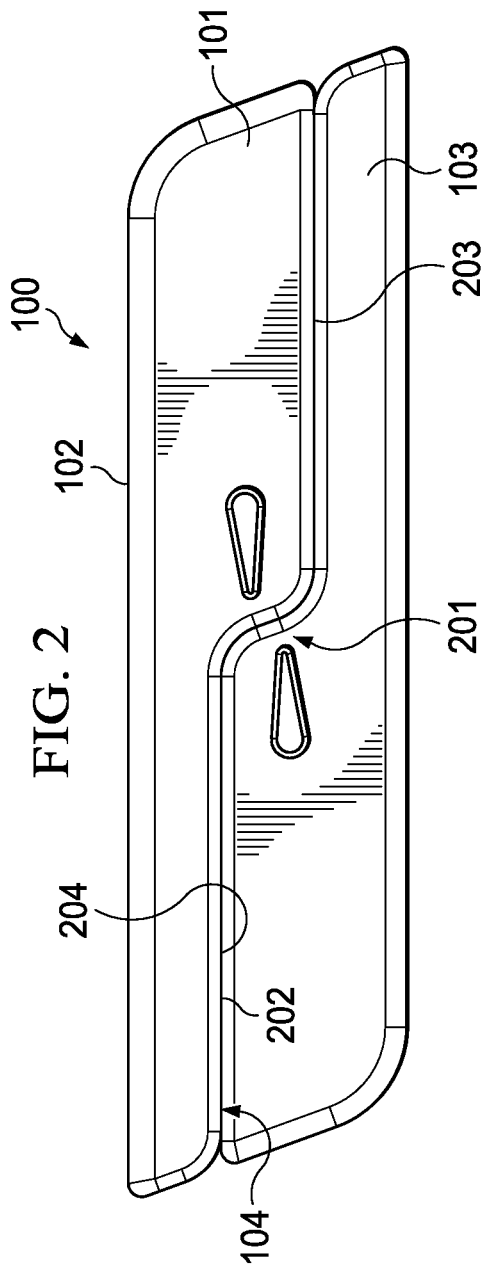
FIG. 2 is a side-elevational view in accordance with the disclosure.

FIGS. 1 and 2 present an illustrative apparatus 100 that accords with certain of the teachings described herein. For the sake of illustration it will be presumed that this apparatus 100 comprises a portable electronic device such as, but not limited to, a portable communications device. It will be understood, however, that the present teachings are not especially limited in such regards and that this example is intended to serve an illustrative purpose rather than as a suggestion regarding any limitations in these regards.

This apparatus 100 includes a first housing 101 having an upper surface 102 and a second housing 103 that also has an upper surface 104. In this illustrative example the first housing 101 includes a display 105 (such as, but not limited to, a touch-screen display of choice). Also in this example the first housing 101 and the second housing 103 share a substantially same footprint and, to some extent, have form factors that are mirror images to one another.

The upper surface 102 of the first housing 101 is substantially planar in this example. The upper surface 104 of the second housing 103, however, includes a non-planar portion 201 (shown with particular clarity in FIG. 2). In this example this non-planar portion 201 comprises a sloped step that connects a first planar portion 202 to a second planar portion 203. The bottom surface 204 of the first housing 101, in turn, at least substantially conforms to the upper surface 104 of the second housing 103 (including the non-planar portion 201 of that upper surface 104). So configured, the bottom surface 204 of the first housing 101 interlocks with the upper surface 104 (including the non-planar portion 201) of the second housing 103. (As used herein, the expression "interlock" will be understood to include both a locking engagement as well as a non-locking mating/meeting of opposing surfaces that are not wholly planar.)

Figure 3:
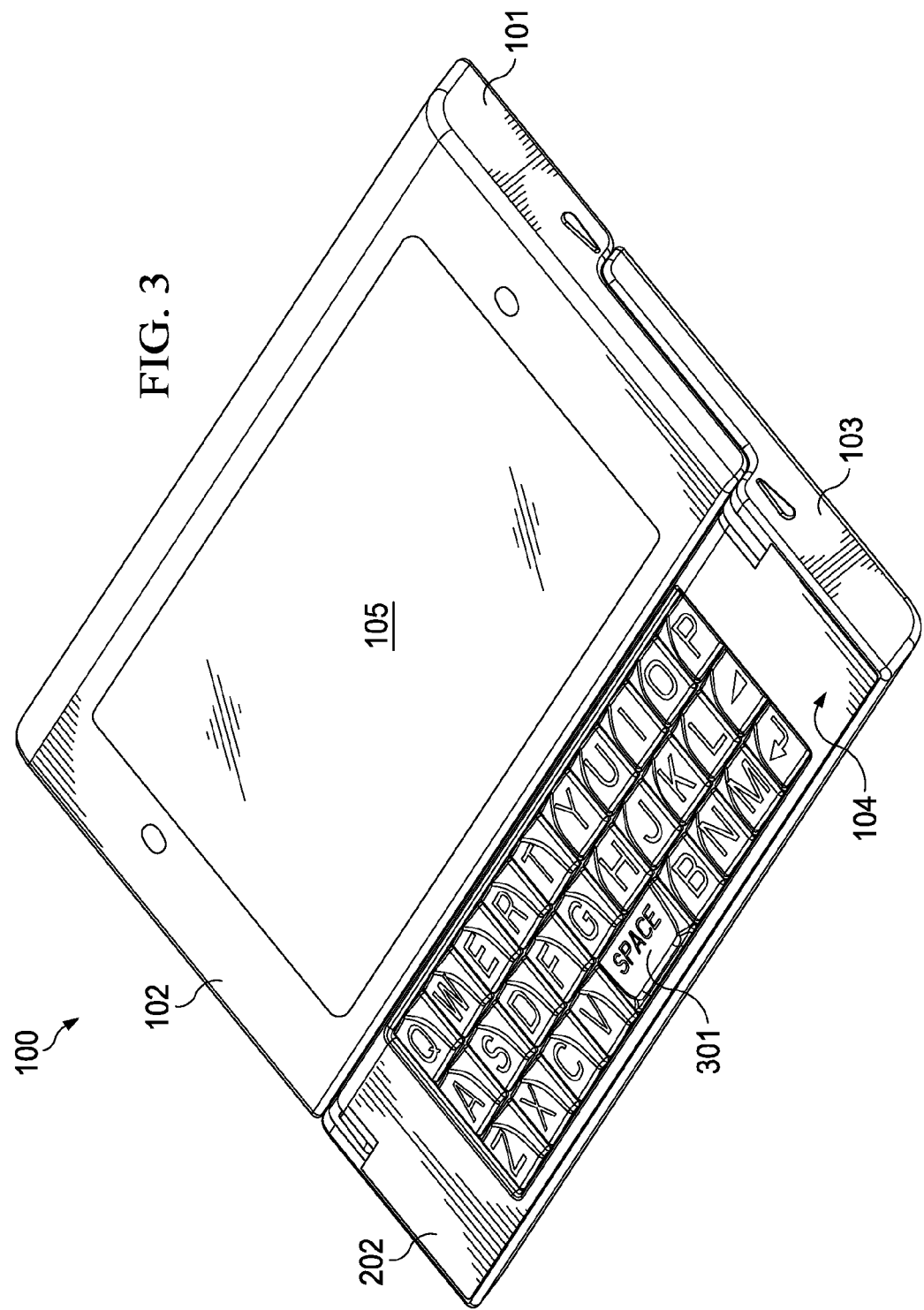
FIG. 3 is a perspective view in accordance with the disclosure.

FIGS. 1 and 2 depict the first housing 101 and the second housing 103 in a stacked configuration that comprises a first position. In particular, the first housing 101 is disposed atop the second housing 103. So configured, the apparatus 100 has a minimized footprint. The present teachings provide as well, however, for at least a second position as illustrated in FIGS. 3 and 4.

As shown in these figures, in the second position (which comprises a deployed position in this example) the first housing 101 and the second housing 103 are disposed adjacent and at least substantially coplanar to one another. In particular, the upper surface 102 of the first housing 101 is disposed at least substantially coplanar to a portion 202 of the upper surface 104 of the second housing 103. It will be noted that again in this illustrative example the upper surface 104 of the second housing 103 conforms to and interlocks with the bottom surface 204 of the first housing 101. In particular, the planar and curved surfaces of both the upper surface 104 and the bottom surface 204 meet in a substantially conformal manner.

In this second position the apparatus 100 has a larger footprint as compared to the first position (though a reduced profile). This larger footprint can readily accommodate, for example, a physical keyboard 301 as comprises a part of the second housing 103 (as shown in FIG. 3). So configured, the apparatus 100 presents the keyboard 301 below but adjacent to the display 105 to thereby comport with ordinary user expectations in these regards.

The physical keyboard 301 can comprise any of a wide variety of keyboard designs (both with respect to keyboard layout as well as actuation mechanisms). These teachings will also accommodate, if desired, using a second display (not shown) to present a virtual keyboard (not shown). Such keyboard designs and alternatives comprise a well understood area of prior art endeavor. As the present teachings are not particularly sensitive to any specific choices in these regards, further elaboration regarding the details of such keyboard will not be provided here for the sake of brevity.

FIGS. 5, 6, and 7 illustrate at least one approach to facilitating relative movement between the first housing 101 and the second housing 103 to move these housings 101 and 103 between the first position and the second position described above. In this example, each lateral side of each housing 101 and 103 includes a cam (in this example, a wedge-shaped cam that comprises, in this particular example, a pear-shaped cam having a rounded bottom) that operates in conjunction with a link 501 that itself includes a first slot 502 and a second slot 503 that are disposed at least substantially collinear to one another. In particular, the first housing 101 includes (on one side as illustrated) a first cam 504 and the second housing 103 includes (on one side as illustrated) a second such cam 505. In this illustrative example these two cams 504 and 505 are disposed at least substantially longitudinally parallel to one another but are also disposed offset to one another by a non-zero distance "Y." The precise dimensions of this offset "Y" will of course vary with respect to the relative sizes of the other displayed components.

FIG. 5 specifically depicts the first housing 101 and the second housing 103 in the aforementioned first position with respect to one another. Accordingly, the first housing 101 is stacked atop the second housing 103. The first slot 502 of the link 501 receives the first cam 504 while the second slot 503 of the link 501 receives the second cam 505.

When the housings 101 and 103 are in the first position, the two cams 504 and 505 are disposed relatively closer to one another (in fact, as proximal to one another as this configuration will permit) and also more or less at the internally-directed end of their respective slot 502 or 503. In this particular configuration the link 501 is disposed at an acute angle with respect to the housings 101 and 103 and one side of each of the cams 504 and 505 is parallel to and contacts a side of a respective one of the slots 502 and 503. It may be noted as well that, in this particular example, there are no biasing members (such as springs or the like) to urge the link in any particular direction.

A user can urge the apparatus 100 towards the aforementioned second position by urging the first housing 101 to the rear and/or by urging the second housing 103 towards the front. When such urging occurs the two housings 101 and 103 slide with respect to one another as shown in FIG. 6. As this movement occurs, the two cams 504 and 505 move further apart from one another and the link 501 effectively pivots about the larger, rounded end of one or both cams 504 and 505.

So configured, the link 501 permits the described sliding movement but will not accommodate, for example, a more significant vertical separation of the two housings 101 and 103. Instead, the pear-shaped form factor of the cams 504 and 505 will cooperate with the shape and length of the slots 502 and 503 to limit such movement. Accordingly, this simple arrangement will largely constrain movement of the two housings 101 and 103 to a specific path between the first position and the second position as well as to those two positions themselves.

Eventually, and as suggested by the illustration provided at FIG. 7, the cams 504 and 505 eventually reach the end of their respective slot 502 and 503. When this occurs, the two housings 101 and 103 can no longer be further moved in this particular direction. By properly sizing and positioning these components, this final position corresponds to the aforementioned second position for the two housings 101 and 103.

Figure 8:
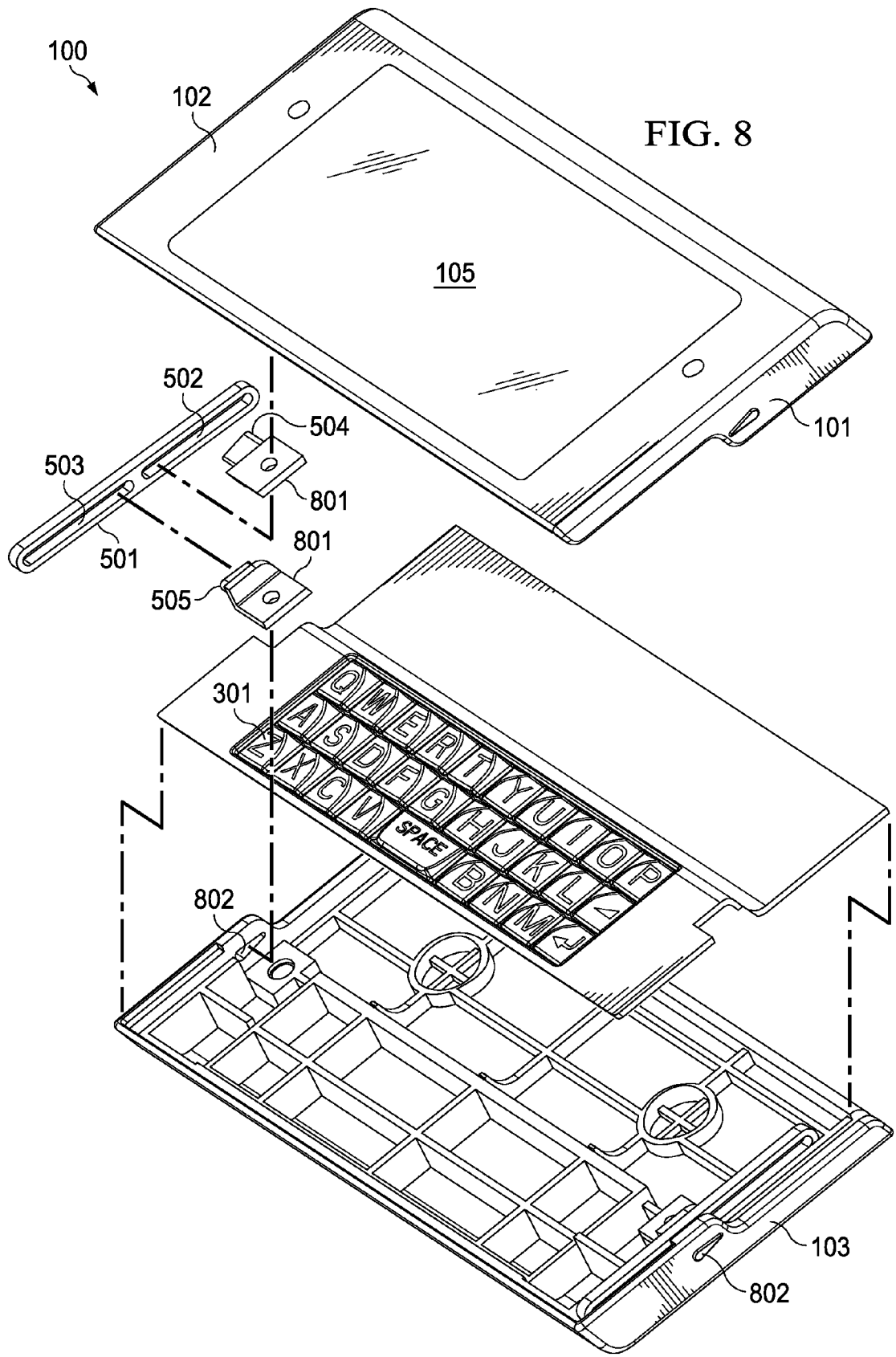
FIG. 8 is an exploded perspective view in accordance with the disclosure.

Referring to FIG. 8, by one approach the aforementioned cams 504 and 505 are disposed within an interior portion of their respective housings 101 and 103. Accordingly, the first cam 504 would be disposed within an interior portion of the first housing 101 and the second cam 505 would be disposed within an interior portion of the second housing 103. By one approach, each such cam 504 and 505 can have a corresponding tab 801 to facilitate attaching the cam 504 and 505 to an interior surface of a respective housing 101 and 103 (using, for example, a threaded attachment member, a brad, a latching mechanism, a friction fit, or some other attachment approach of choice).

By one approach the cams 504 and 505 can be oriented laterally outwardly of the housings 101 and 103 and can have an outer portion that fits, for example, into a corresponding hole 802 in the side of the housing. Using the approach, the link 501 can be (loosely) captivated by a corresponding cam 504 or 505 between the aforementioned tab 801 and the side wall of the respective housing.

For some application settings it may be sufficient to provide only one such link-and-cam assembly. If desired, however, such a link-and-cam assembly can be provided on both opposing sides of the apparatus 100. In this case, and by way of example, a first link is disposed on one side of the apparatus 100 that engages a first cam (that comprises a part of the first housing 101) and a second cam (that comprises a part of the second housing 103) and a second (at least substantially identical) link is disposed on the opposite side of the apparatus 100 that engages a third cam (that comprises a part of the first housing 101) and a fourth cam (that comprises a part of the second housing 103). So configured, link-and-cam assemblies can act as described above to both help to guide relative movement between the two housings 101 and 103 back and forth between the first and second positions.

So configured, a user can conveniently and with considerable assurance manipulate the housings 101 and 103 to expose and deploy the keyboard 301 as desired and to similarly stow that keyboard 301 as needed. These teachings facilitate such movement using only a very few parts and via a simple arrangement that is unlikely to present operational or maintenance challenges. Notwithstanding that simplicity, however, the movement of the housings 101 and 103 is nevertheless both intuitive and sure, firm and unambiguous.

Figure 9:
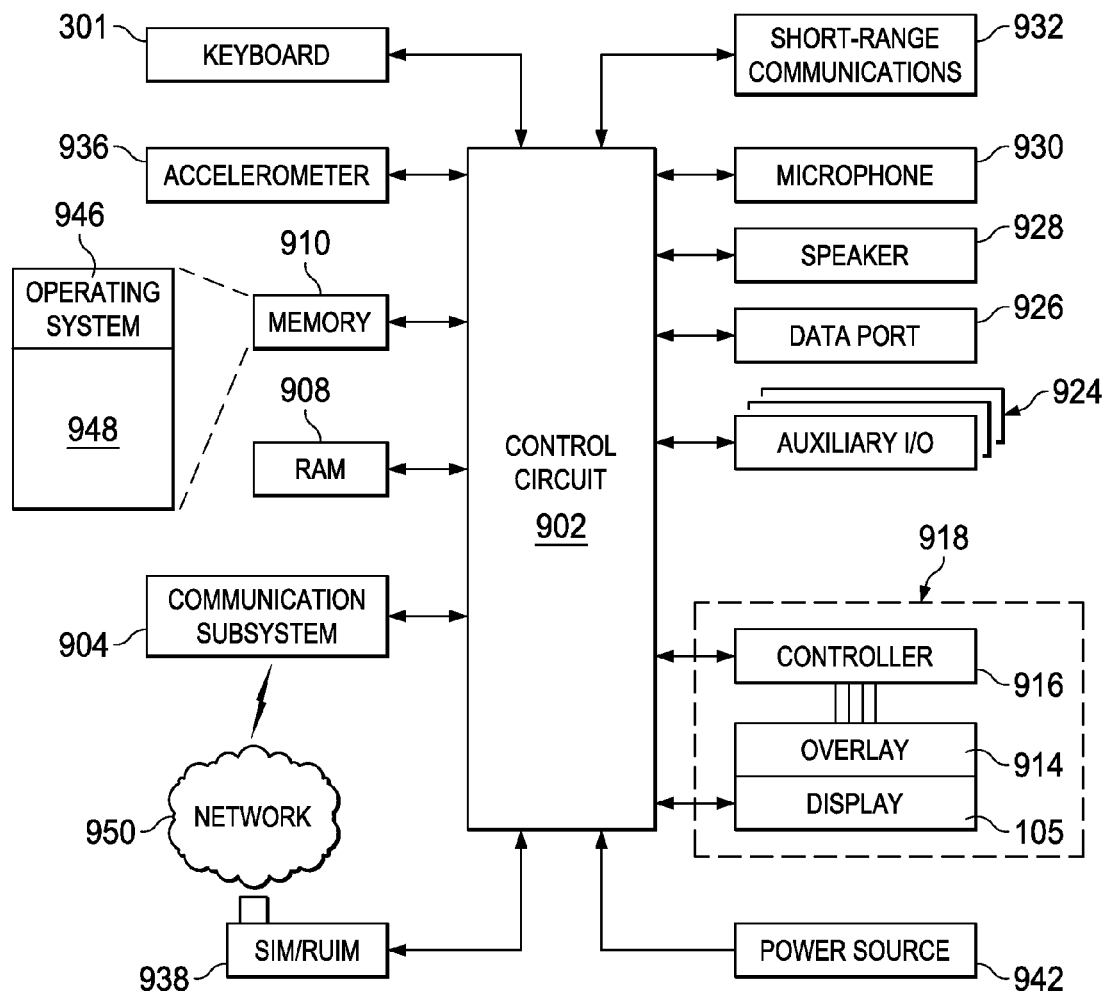
FIG. 9 is a block diagram in accordance with the disclosure.

As suggested above, these teachings can be applied in conjunction with any of a wide variety of apparatuses including a portable electronics device such as a so-called smartphone or tablet-styled wireless computer. Referring to FIG. 9, an exemplary portable electronic device includes a control circuit 902 that controls the overall operation of the portable electronic device.

Communication functions, including data and voice communications, are performed through a communication subsystem 904. The communication subsystem receives messages from and sends messages to a wireless network 950. The wireless network 950 may be any type of wireless network, including, but not limited to, data wireless networks, voice wireless networks, and networks that support both voice and data communications.

A power source 942, such as one or more rechargeable batteries or a port to an external power supply, powers the electronic device. In this illustrative example, the control circuit 902 may also interact with an accelerometer 936 that may be utilized to detect direction of gravitational forces or gravity-induced reaction forces.

The control circuit 902 interacts with other elements, such as a Random Access Memory (RAM) 908, a memory 910, the aforementioned display 105 along with a touch-sensitive overlay 914 operably coupled to an electronic controller 916 that together comprise a touch-sensitive display 918, an auxiliary input/output (I/O) subsystem 924, a data port 926, a speaker 928, a microphone 930, and a short-range communication subsystem 932.

One or more user interfaces are provided including the aforementioned keyboard 301. Input via a graphical user interface can also be provided via the touch-sensitive overlay 914. The control circuit 902 interacts with the touch-sensitive overlay 914 via the electronic controller 916. Information, such as text, characters, symbols, images, icons, and other items that may be displayed or rendered on a portable electronic device, is displayed on the display 105 via the control circuit 902.

To identify a subscriber for network access, the portable electronic device may utilize a Subscriber Identity Module or a Removable User Identity Module (SIM/RUIM) card 938 for communication with a network, such as the wireless network 950. Alternatively, user identification information may be programmed into the memory 910.

The portable electronic device in this example also includes an operating system 946 and software programs, applications, or components 948 that are executed by the control circuit 902 and are typically stored in a persistent, updatable store such as the memory 910. Additional applications or programs may be loaded onto the portable electronic device through the wireless network 950, the auxiliary I/O subsystem 924, the data port 926, the short-range communications subsystem 932, or any other suitable subsystem 934. The memory 910 may comprise a non-transitory storage media that stores executable code, when executed, causes one or more of functions or actions as described herein.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
   a first housing having an upper surface and having at least a first cam;
   a second housing having an upper surface and having at least a second cam;
   a link configured and disposed to slidingly engage both the first cam and the second cam when moving the first housing with respect to the second housing between a first position and a second position
   wherein:
   the first position comprises a stacked configuration with the first housing disposed atop the second housing; and
   the second position comprises a deployed configuration with the upper surface of the first housing disposed at least substantially coplanar to at least a portion of the upper surface of the second housing.

2. The apparatus of claim 1 wherein the first housing includes a display and the second housing includes a keyboard.

3. The apparatus of claim 1 wherein the link includes a first slot that receives the first cam and a second slot that receives the second cam.

4. The apparatus of claim 3 wherein the first slot is disposed at least substantially collinear with respect to the second slot.

5. The apparatus of claim 1 wherein the first cam and the second cam each comprise a pear-shaped cam.

6. The apparatus of claim 1 wherein the first cam and the second cam are disposed offset and at least substantially longitudinally parallel to one another.

7. The apparatus of claim 1 wherein the first cam is disposed within an interior portion of the first housing and the second cam is disposed within an interior portion of the second housing.

8. The apparatus of claim 1 wherein the first cam is disposed on a first side of the first housing and the second cam is disposed on a first side of the second housing, and wherein:
   the first housing includes a third cam;
   the second housing includes a fourth cam;
   a second link configured and disposed to slidingly engage the third cam and the fourth cam;
wherein the third cam, the fourth cam, and the second link are also configured such that the first housing is movable with respect to the second housing between the first position and the second position.

9. The apparatus of claim 8 wherein the first cam and the third cam are disposed on opposing sides of the first housing and the second cam and the fourth cam are disposed on opposing sides of the second housing.

10. The apparatus of claim 1 wherein the upper surface of the second housing has a non-planar upper surface and wherein the first housing has a bottom surface that at least substantially conforms to the non-planar upper surface of the second housing such that the bottom surface of the first housing interlocks with the non-planar upper surface of the second housing.

11. The apparatus of claim 10 wherein a portion of the first housing is disposed atop a portion of the second housing in the second position.

\* \* \* \* \*

UNITED STATES PATENT AND TRADEMARK OFFICE
CERTIFICATE OF CORRECTION

| | | |
|---|---|---|
| PATENT NO. | : 8,891,236 B2 | Page 1 of 1 |
| APPLICATION NO. | : 13/555792 | |
| DATED | : November 18, 2014 | |
| INVENTOR(S) | : Fyke | |

It is certified that error appears in the above-identified patent and that said Letters Patent is hereby corrected as shown below:

On the TITLE PAGE
Item (74) Attorney, Agent, or Firm - delete "Ftch" and insert --Fitch--.

Signed and Sealed this
Thirty-first Day of March, 2015

Michelle K. Lee
*Director of the United States Patent and Trademark Office*